(12) United States Patent
Matsuzaki

(10) Patent No.: US 10,610,774 B2
(45) Date of Patent: Apr. 7, 2020

(54) NON-TRANSITORY STORAGE MEDIUM HAVING GAME PROGRAM STORED THEREIN, INFORMATION PROCESSING APPARATUS, INFORMATION PROCESSING SYSTEM, GAME PROCESSING METHOD

(71) Applicant: NINTENDO CO., LTD., Minami-ku, Kyoto (JP)

(72) Inventor: Yasuhiko Matsuzaki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 421 days.

(21) Appl. No.: 15/426,177

(22) Filed: Feb. 7, 2017

(65) Prior Publication Data
US 2017/0354866 A1   Dec. 14, 2017

(30) Foreign Application Priority Data
Jun. 10, 2016 (JP) .................................. 2016-115915

(51) Int. Cl.
*A63F 13/2145*   (2014.01)
*A63F 13/21*   (2014.01)
(Continued)

(52) U.S. Cl.
CPC ........ *A63F 13/2145* (2014.09); *A63F 13/211* (2014.09); *A63F 13/5375* (2014.09);
(Continued)

(58) Field of Classification Search
CPC ............... A63F 13/2145; A63F 13/211; A63F 13/5375; A63F 2300/64; G06F 3/0416; G06T 13/80
See application file for complete search history.

(56) References Cited

U.S. PATENT DOCUMENTS 4,016,362 A * 4/1977 Bristow .................. A63F 13/00
                                                345/682
4,054,919 A * 10/1977 Alcorn ................... G09G 1/165
                                                348/511
(Continued)

FOREIGN PATENT DOCUMENTS

WO   WO 2011/096352   8/2011

OTHER PUBLICATIONS

Just Dance Review Written by Tom Orry Created on Jan 21, 2010, 4 pages. https://www.videogamer.com/reviews/just-dance-review.
(Continued)

*Primary Examiner* — David L Lewis
*Assistant Examiner* — Matthew D Hoel
(74) *Attorney, Agent, or Firm* — Nixon & Vanderhye PC

(57) ABSTRACT

A technique for allowing a user to easily understand an operation method of an input apparatus is disclosed. An example of non-transitory storage medium having a game program stored therein is performed by a computer of an information processing apparatus, and the information processing apparatus is connected to a display apparatus and an input apparatus and performs game processing on the basis of an operation performed by a user. When the game processing is in a predetermined situation, the game program causes the computer of the information processing apparatus to perform outputting an operation model video showing a model of an operation of the input apparatus together with a video related to a content of the game to the display apparatus. In the outputting, an animation video, which indicates an animation occurring in the game when an operation indicated by the operation model video is performed, and the operation model video are displayed side by side.

17 Claims, 6 Drawing Sheets

(51) Int. Cl.
  *G06F 3/041* (2006.01)
  *G06T 13/80* (2011.01)
  *A63F 13/5375* (2014.01)
  *A63F 13/211* (2014.01)
(52) U.S. Cl.
  CPC ............ *G06F 3/0416* (2013.01); *G06T 13/80* (2013.01); *A63F 2300/64* (2013.01)

(56) References Cited

U.S. PATENT DOCUMENTS

| | | | | |
|---|---|---|---|---|
| 4,738,451 A * | 4/1988 | Logg | A63F 13/10 | 463/15 |
| 4,752,069 A * | 6/1988 | Okada | A63F 13/10 | 463/23 |
| 4,905,147 A * | 2/1990 | Logg | A63F 13/10 | 348/E9.018 |
| 4,925,189 A * | 5/1990 | Braeunig | A63F 13/06 | 273/148 B |
| 4,988,981 A * | 1/1991 | Zimmerman | A61B 5/1114 | 345/156 |
| 5,185,561 A * | 2/1993 | Good | G06F 3/014 | 318/432 |
| 5,288,078 A * | 2/1994 | Capper | A63F 13/06 | 345/156 |
| 5,405,151 A * | 4/1995 | Naka | A63F 13/10 | 345/684 |
| 5,411,270 A * | 5/1995 | Naka | A63F 13/10 | 463/33 |
| 5,411,272 A * | 5/1995 | Naka | G09G 1/007 | 345/473 |
| 5,470,080 A * | 11/1995 | Naka | A63F 13/10 | 463/33 |
| 5,577,981 A * | 11/1996 | Jarvik | A63B 21/154 | 434/247 |
| 5,680,533 A * | 10/1997 | Yamato | A63F 13/10 | 345/473 |
| 5,704,837 A * | 1/1998 | Iwasaki | A63F 13/00 | 463/2 |
| 5,707,288 A * | 1/1998 | Stephens | A63F 13/00 | 345/418 |
| 5,736,990 A * | 4/1998 | Barrus | G06T 11/00 | 345/630 |
| 5,853,327 A * | 12/1998 | Gilboa | A63F 3/00643 | 463/39 |
| 5,913,727 A * | 6/1999 | Ahdoot | A63F 13/06 | 345/156 |
| 5,935,003 A * | 8/1999 | Stephens | A63F 13/00 | 345/418 |
| 5,963,218 A * | 10/1999 | Naka | A63F 13/10 | 345/474 |
| 5,973,704 A * | 10/1999 | Nishiumi | A63F 13/02 | 345/162 |
| 6,010,405 A * | 1/2000 | Morawiec | A63F 13/005 | 345/501 |
| 6,123,619 A * | 9/2000 | Tokita | A63F 13/10 | 463/1 |
| 6,126,545 A * | 10/2000 | Takahashi | A63F 13/10 | 345/419 |
| 6,227,974 B1 * | 5/2001 | Eilat | A63F 13/005 | 273/148 B |
| 6,241,524 B1 * | 6/2001 | Aoshima | A63F 13/10 | 434/118 |
| 6,241,609 B1 * | 6/2001 | Rutgers | A63F 13/12 | 463/31 |
| 6,251,012 B1 * | 6/2001 | Horigami | A63F 13/10 | 273/148 B |
| 6,270,414 B2 * | 8/2001 | Roelofs | G06F 3/011 | 345/156 |
| 6,299,535 B1 * | 10/2001 | Tanaka | A63F 13/10 | 463/1 |
| 6,353,932 B2 * | 3/2002 | Stembridge | A41D 13/0015 | 2/69 |
| 6,764,401 B1 | 7/2004 | Akatsuka | | |
| 7,011,582 B1 * | 3/2006 | Yamamoto | A63F 13/10 | 463/15 |
| 7,042,440 B2 * | 5/2006 | Pryor | A63F 13/02 | 345/158 |
| 7,046,151 B2 * | 5/2006 | Dundon | G06F 3/011 | 340/407.1 |
| 7,056,216 B2 * | 6/2006 | Ohshima | G06F 3/011 | 463/36 |
| 7,071,914 B1 * | 7/2006 | Marks | G06F 3/005 | 345/156 |
| 7,292,151 B2 * | 11/2007 | Ferguson | A61B 5/1124 | 340/407.1 |
| 7,316,617 B2 * | 1/2008 | Suzuki | A63F 13/10 | 463/30 |
| 7,359,121 B2 * | 4/2008 | French | A63B 24/0003 | 359/629 |
| 7,424,388 B2 * | 9/2008 | Sato | A63F 13/06 | 345/156 |
| 7,491,879 B2 * | 2/2009 | Hikino | G10H 1/348 | 84/609 |
| 7,542,040 B2 * | 6/2009 | Templeman | G06F 3/011 | 345/474 |
| 7,594,853 B2 * | 9/2009 | Noro | A63F 13/10 | 273/148 B |
| 7,596,466 B2 * | 9/2009 | Ohta | A63F 13/10 | 702/152 |
| 7,690,994 B2 * | 4/2010 | Dohta | A63F 13/06 | 345/156 |
| 7,701,439 B2 * | 4/2010 | Hillis | G03H 1/0005 | 345/156 |
| 7,716,008 B2 * | 5/2010 | Ohta | A63F 13/10 | 702/141 |
| 7,760,248 B2 * | 7/2010 | Marks | G06F 3/017 | 348/14.09 |
| 7,774,155 B2 * | 8/2010 | Sato | A63F 13/06 | 345/156 |
| 7,938,725 B2 * | 5/2011 | Okamura | A63F 13/10 | 273/108.1 |
| 8,152,640 B2 * | 4/2012 | Shirakawa | A63F 13/10 | 463/31 |
| 8,167,720 B2 * | 5/2012 | Sugioka | A63F 13/06 | 463/36 |
| 8,529,355 B2 * | 9/2013 | Hiratake | G06F 3/0346 | 273/108.1 |
| 10,010,793 B2 | 7/2018 | Johnson et al. | | |
| 2002/0109668 A1 | 8/2002 | Rosenberg | | |
| 2004/0087363 A1 | 5/2004 | Bogenn | | |
| 2005/0246638 A1 | 11/2005 | Whitten | | |
| 2006/0094502 A1 | 5/2006 | Katayama | | |
| 2007/0021199 A1 * | 1/2007 | Ahdoot | A63B 24/0003 | 463/30 |
| 2007/0021207 A1 * | 1/2007 | Ahdoot | A63B 24/0003 | 463/36 |
| 2007/0191096 A1 * | 8/2007 | Tanaka | A63F 13/00 | 463/31 |
| 2008/0001951 A1 * | 1/2008 | Marks | A63F 13/06 | 345/474 |
| 2008/0119286 A1 | 5/2008 | Brunstetter | | |
| 2011/0025614 A1 | 2/2011 | Ohta | | |
| 2011/0306395 A1 | 12/2011 | Ivory et al. | | |
| 2012/0295707 A1 | 11/2012 | Nonaka | | |

OTHER PUBLICATIONS

Just Dance Review (Wii) Uploaded by—wiiviewr Uploaded on Mar. 26, 2010, 2 pages. https://www.youtube.com/watch?v=xvj9hJpviO.

CGRundertow Get Up and Dance for PlayStation 3 Video Game Review, Uploaded by CGRundertow, Dec. 15, 2011, 2 pages. https://www.youtube.com/watch ?v=h F4QTvLq84 E.

Kirby: Canvas Curse Review on Gamespot by Jeff Gerstmann, Jun. 13, 2005, 8 pages. http://www.gamespot.com/review/kirbycanvas-curse-review/1900-6127444/.

Get Up and Dance Q&A by Akhil Malhortra Oct. 19, 2011, 5 pages. http://gamevolution.co.uk/2011 /1 O/get-up-and-dance-qa-2/.

(56) References Cited

OTHER PUBLICATIONS

Let's play Kirby Canvas Curse pt 1—Tutorial Uploaded by JoxiahWolfblade, Sep. 12, 2012, 2 pages. https://www.youtube.com/watch?v=82J6cVfXWDc.
New Super Mario Bros. Wii Game Manual. Released Nov. 11, 2009, 34 pages. http://www.nintendo.com/consumer/gameslist/manuals/Wii_NSMBW.pdf. Last Accessed Sep. 29, 2012.
Super Mario Wild—Super Guide, retrieved Jul. 2, 2019, 5 pages. https://www.mariowiki.com/Super_Guide.
Super Mario Wild—Mario vs. Donkey Kong: Mini-Land Mayhem!, retrieved Jul. 2, 2019, 29 pages. https://www.mariowild.com/Mario_vs._Donkey_Kong:_Mini-Land_Mayhem!.

\* cited by examiner

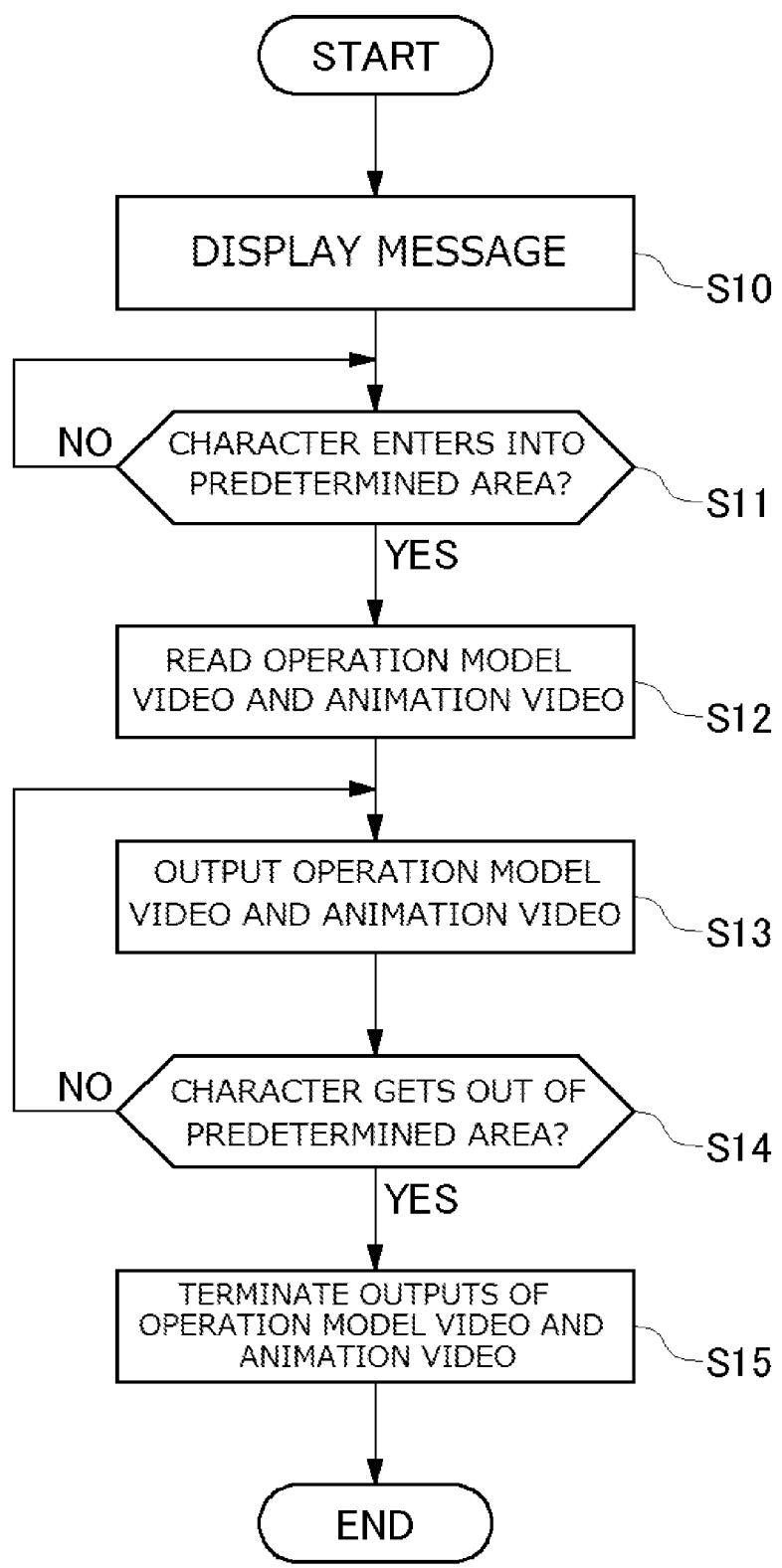

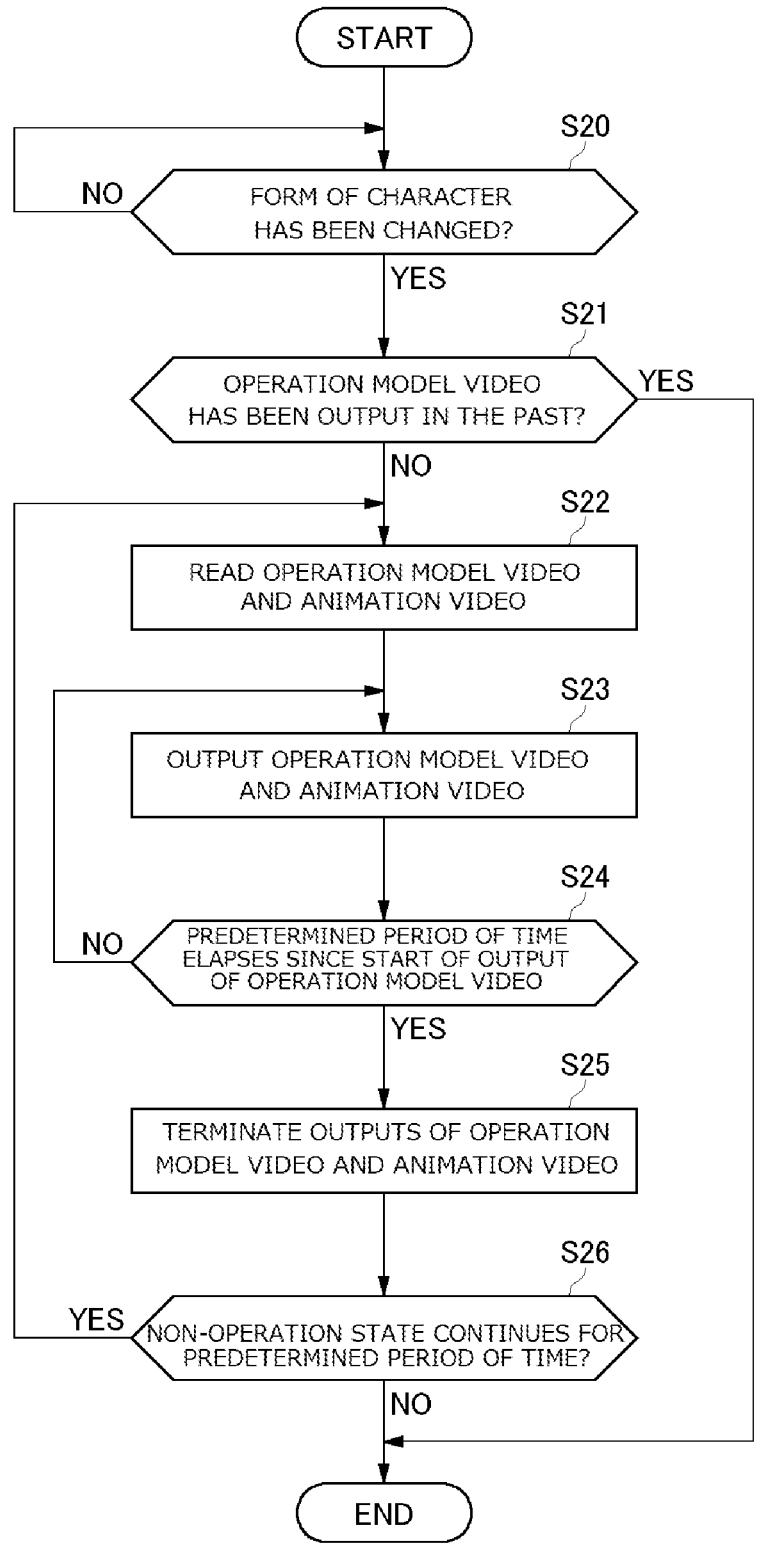

NON-TRANSITORY STORAGE MEDIUM HAVING GAME PROGRAM STORED THEREIN, INFORMATION PROCESSING APPARATUS, INFORMATION PROCESSING SYSTEM, GAME PROCESSING METHOD

CROSS REFERENCE TO RELATED APPLICATION

This nonprovisional application is based on Japanese Patent Application No. 2016-115915 filed with the Japan Patent Office on Jun. 10, 2016, the entire contents of which are hereby incorporated by reference.

FIELD

The present disclosure relates to a game program and the like having a function of performing a model of an operation method of a game.

BACKGROUND AND SUMMARY

In recent years, various game apparatuses are sold. In the past, most of input apparatuses of games mainly use push buttons. Recently, input apparatuses having a motion sensor and a touch panel are widely available. With an input apparatus having a motion sensor, an input is given to a game apparatus by moving the input apparatus. With an input apparatus having a touch panel, an input is given to a game apparatus by tapping the touch panel and swiping.

In addition to diversification of such input apparatuses, contents of game are becoming increasingly complicated due to the improvement of processing performance of computers. The operations of games depend on the scenes within game software, controllers, and games. In order to enjoy the game, the user needs to learn what kind of operation can be performed in each scene of each game.

An object of the present disclosure is to provide a game program and the like performing a model which allows a user to easily understand an operation method of an input apparatus.

There is provided a non-transitory storage medium having a game program stored therein, the program causing a computer of an information processing apparatus which is connected to a display apparatus and an input apparatus and performs game processing on the basis of an operation performed by a user to perform: outputting, when the game processing is in a predetermined situation, an operation model video showing a model of an operation of the input apparatus together with a video related to a content of a game to the display apparatus.

The "operation model video" is a video of model that shows how the input apparatus is operated, and it is a video that can be done by performing the operation. Unlike things such as an input apparatus alternately displaying two images, i.e., an image in which the input apparatus is inclined to the left and an image in which the input apparatus is inclined to the right, for example, the "operation model video" shows how the user operates the input apparatus continuously without omission of the scene, and allows the user to get a feeling of a specific operation. Specifically, for example, the "operation model video" is a video having a frame rate that allows the user to accurately understand the action of the operation in order to continuously represent the scene without omission. With this configuration, the user can learn how to operate the input apparatus concretely by looking at the operation model video.

In the exemplary embodiment, the operation model video may be a video obtained by shooting an actual operation performed with the input apparatus.

A video obtained by shooting the scene when the user actually performs the operation is used, and therefore, the user can easily imitate the operation model.

In the exemplary embodiment, the operation model video may have a frame rate that is high enough to be played smoothly.

As described above, the video has a frame rate that can express continuously the action of the operation without omission of the scene so that the video is not jumpy. So, the user can learn how to operate the input apparatus in a concrete manner by watching the operation model video.

In the exemplary embodiment, the operation model video may contain at least a part of a body of an operator of the input apparatus.

Since the operation model video contains at least a part of the body of the operator, information such as how to grab the input apparatus can also be conveyed, and the user can learn the proper operation.

In the exemplary embodiment, an animation video indicating an animation occurring in the game when the operation indicated by the operation model video is performed may be output together with the operation model video. Here, the operation model video and the animation video may be output side by side.

Both of the operation model video and the animation video in the game according to the operation are output as described above, so that the user can easily understand what kind of animation is to be performed to cause the game to perform what kind of operation. The operation model video and the animation video are output side by side, so that the user can intuitively understand the relationship between the operation model video and the animation video.

In the exemplary embodiment, the input apparatus may be an input apparatus has a motion sensor and/or a touch panel. It may not be easy to learn how to operate the input apparatus, and therefore, it is effective to guide the operation method by showing the operation model video.

In the exemplary embodiment, the input apparatus may have two controllers. In the case of the input apparatus having two controllers, different inputs can be accepted by the input apparatus depending on the relative relationship between the positions and velocities of the two controllers. It may not be easy to learn how to operate the input apparatus, and therefore, it is effective to guide the operation method by showing the operation model video.

In the exemplary embodiment, in the output, when a new operation is ready to be performed in accordance with a progress of the game, the operation model video about the operation may start to be output. With this configuration, it is possible to learn a new operation without difficulty.

In the exemplary embodiment, the non-transitory storage medium may cause the computer of the information processing apparatus to perform controlling an object in the game according to an operation with the input apparatus performed by user and outputting a result thereof to the display apparatus, wherein the output of the operation model video may be started when the object enters into a predetermined range in a virtual space.

With this configuration, when the user enters into a new range in the virtual space, it is possible to teach the user an operation method that is enabled in that range.

In the exemplary embodiment, the non-transitory storage medium may cause the computer of the information processing apparatus to perform counting a time from when the operation model video start to be output, wherein in the output, the output of the operation model video may be terminated when a time counting result reaches a predetermined time.

With this configuration, it is possible to finish outputting the operation model video when the user has learned a new operation related to the operation model video, and it is possible to use more area of the screen for the image of the game, and the user can concentrate on the game more greatly.

There is provided an information processing apparatus connected to a display apparatus and an input apparatus and performing game processing on the basis of an operation performed by a user, the information processing apparatus including: an output unit outputting, when the game processing is in a predetermined situation, an operation model video showing a model of an operation of the input apparatus together with a video related to a content of the game to the display apparatus.

There is provided an information processing system including: a display apparatus; an input apparatus; and an information processing apparatus performing game processing on the basis of an operation performed by a user, wherein the information processing apparatus outputs, when the game processing is in a predetermined situation, an operation model video showing a model of an operation of the input apparatus together with a video related to a content of the game to the display apparatus.

There is provided a game processing method for performing game processing on the basis of an operation performed by a user with an information processing apparatus made by connecting a display apparatus and an input apparatus, the game processing method including: outputting, when the game processing is in a predetermined situation, an operation model video showing a model of an operation of the input apparatus together with a video related to a content of the game to the display apparatus.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 is a diagram showing an example of an operation in which the game system of the present embodiment displays an operation model video; and FIG. 6 is a diagram showing another example of an operation in which the game system of the present embodiment displays an operation model video.

DETAILED DESCRIPTION OF NON-LIMITING EXAMPLE EMBODIMENTS

Hereinafter, a game system and a game program according to the embodiment of the present technique will be described with reference to the drawings.

[Configuration of Game System]

Figure 1:
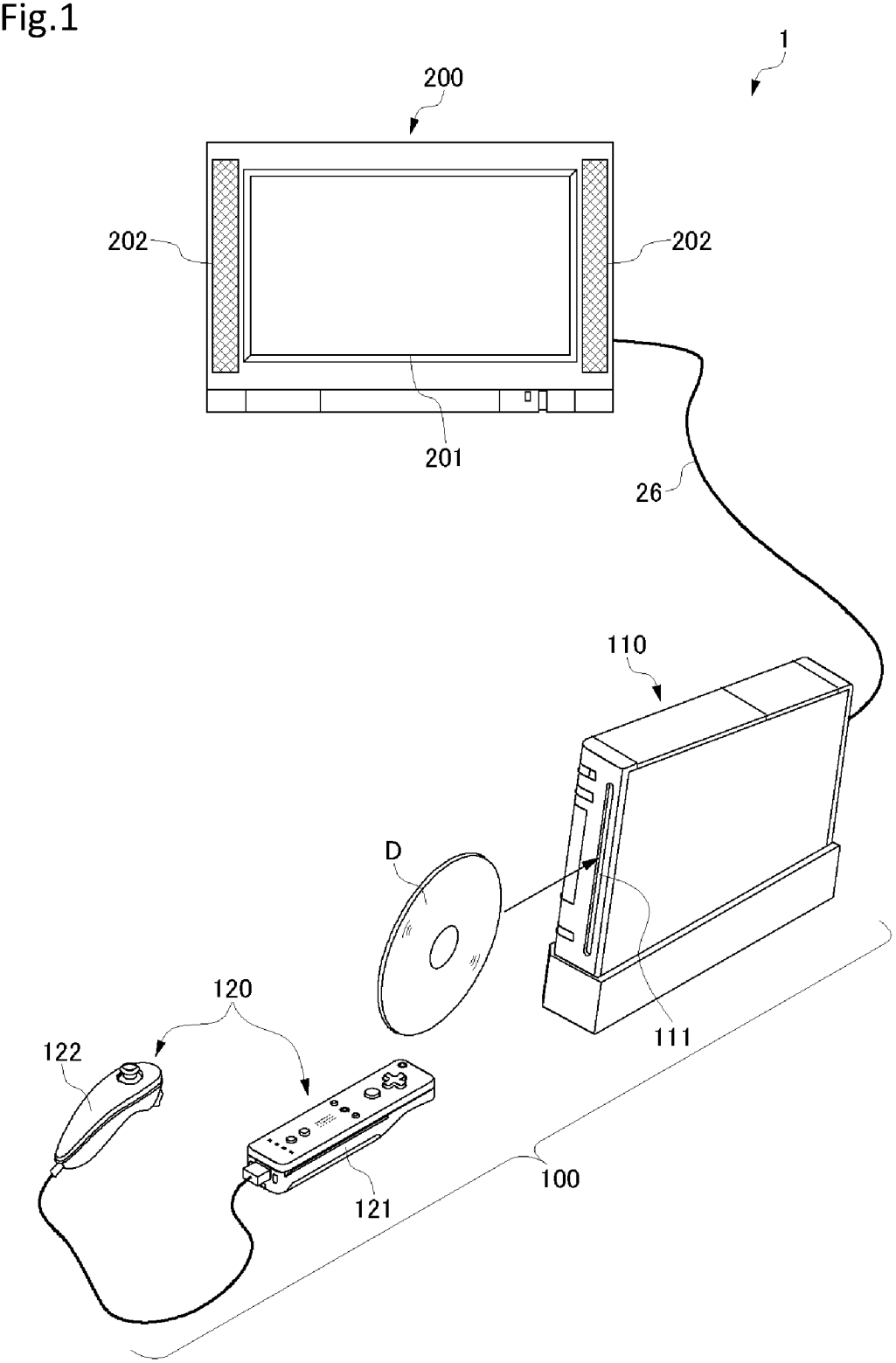
FIG. 1 is an external view of a game system of an embodiment.

FIG. 1 is an external view illustrating a game system according to an embodiment of the present technique. The game system 1 includes a game apparatus 100 and a monitor 200. The game apparatus 100 includes a game apparatus main body 110 and a controller 120. The game apparatus main body 110 is connected to the monitor 200.

The controller 120 is configured by connecting a first controller 121 and a second controller 122 to each other. In the game apparatus main body 110, a disk slot 111 into which an optical disk D is inserted is formed. The monitor 200 has a screen 201 and a speaker 202.

The controller 120 transmits a controller signal to the game apparatus main body 110 by radio. The game apparatus main body 110 reads and executes the game program from the optical disk D and performs game processing according to the controller signal received by radio from the controller 120. The monitor 200 outputs video with the screen 201 and outputs sound from the speaker 202 according to the game processing executed by the game apparatus main body 110.

Figure 2:
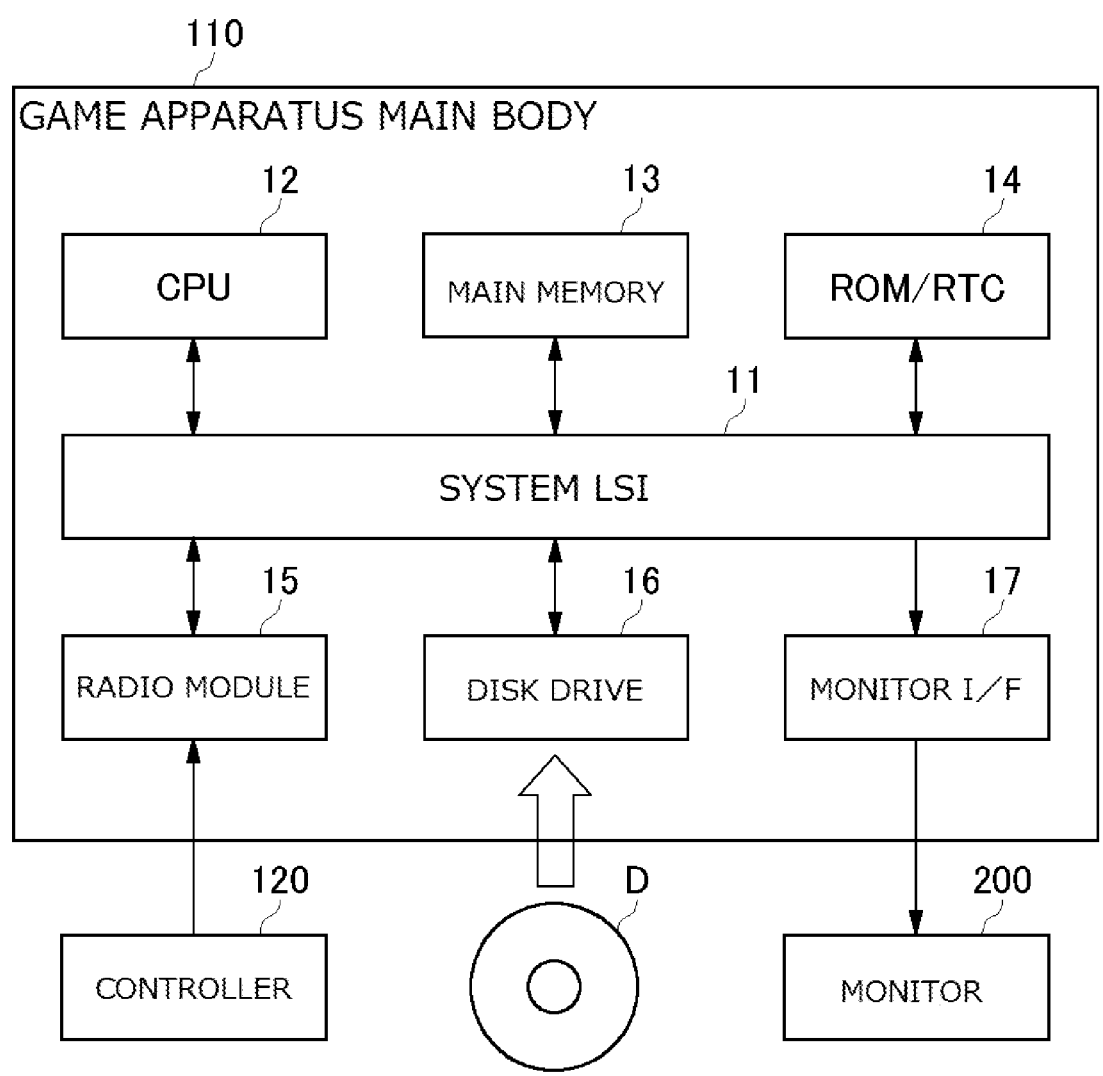
FIG. 2 is a block diagram illustrating a game apparatus main body.

FIG. 2 is a block diagram illustrating the game apparatus main body 110. The game apparatus main body 110 includes a system Large Scale Integration (LSI) 11, a Central Processing Unit (CPU) 12, a main memory 13, a Read Only Memory/Real Time Clock (ROM/RTC) 14, a radio module 15, a disk drive 16, and a monitor interface (I/F) 17. The CPU 12, the main memory 13, the ROM/RTC 14, the radio module 15, the disk drive 16, and the monitor I/F 17 are connected to the system LSI 11, respectively.

The system LSI 11 performs processing such as control of data transmission between each constituent element connected thereto, generation of an image to be displayed, acquisition of data from an external apparatus, and the like. The CPU 12 executes the game processing by executing the game program stored in the optical disk D, and functions as a game processor. The game program stored in the optical disk D corresponds to the "game program" of the present technique. It is to be noted that the game program is not limited to being stored in the optical disk D, but may be stored in a cartridge containing a nonvolatile memory or a NAND flash memory (not shown) in the game apparatus main body 110, readout therefrom, and executed. Alternatively, the game program may be downloaded to the storage apparatus (NAND flash memory or the like) in the game apparatus main body 110 via the network. The main memory 13 stores the game program read out from the optical disk D and is used as a work area or a buffer area of the CPU 12. The ROM/RTC 14 has a ROM (boot ROM) in which a program for starting the game apparatus main body 110 is incorporated, and a clock circuit RTC for counting time.

The radio module 15 receives the controller signal transmitted via radio from the controller 120 and transmits the control signal from the game apparatus main body 110 to the controller 120 by radio. The radio module 15 modulates the carrier wave of a predetermined frequency with the control signal using a short range radio communication technique such as Bluetooth (registered trademark), and radiates the weak radio wave signal. The disk drive 16 reads program data, texture data, and the like from the optical disk D and writes the read data to the memory in the system LSI 11 and the main memory 13. The monitor I/F 17 outputs the video and audio signals generated by the system LSI 11 to the monitor 200.

Back to FIG. 1, the first controller 121 has a substantially rectangular parallelepiped housing, and the housing is provided with a plurality of operation members. In the side view, the second controller 122 has a housing that is curved so as to descend from the horizontal portion of the tip side toward the rear end side, and an analog joystick is provided on the housing.

Figure 3:
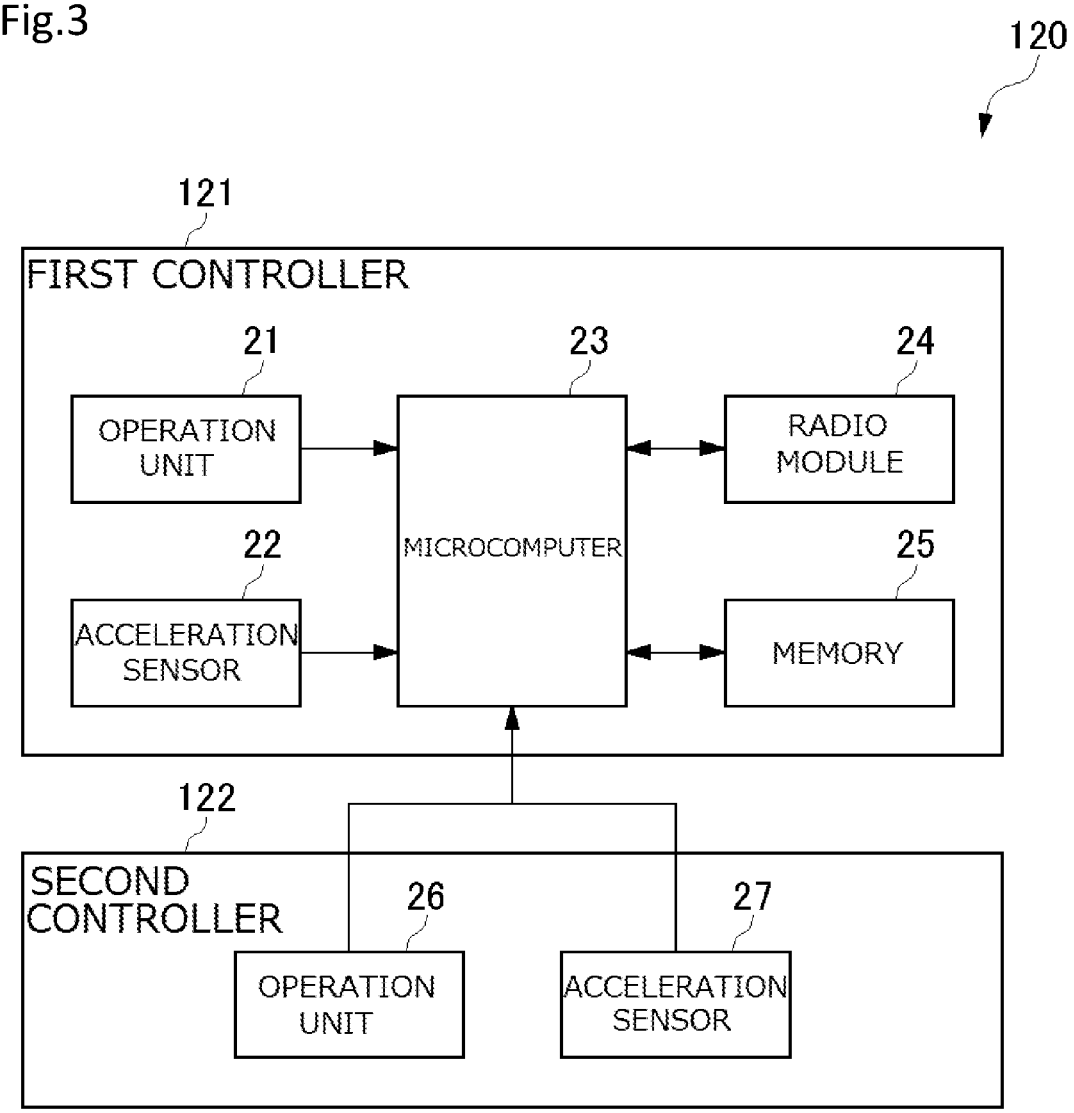
FIG. 3 is a block diagram illustrating a configuration of a controller.

FIG. 3 is a block diagram showing the configuration of the controller 120. As described above, the controller 120 is composed of the first controller 121 and the second controller 122, and is connected with a connection line. The first controller 121 is a main controller and includes an operation unit 21, an acceleration sensor 22, a microcomputer 23, a radio module 24, and a memory 25. The first controller 121 may include a gyro sensor. The second controller 122 is a sub controller, and is provided with an operation unit 26 and an acceleration sensor 27.

The acceleration sensor 22 of the first controller 121 and the acceleration sensor 27 of the second controller 122 are capacitance type acceleration sensors. The acceleration sensors 22 and 27 detect acceleration and gravitational acceleration of linear components for each of three sensing axes in the vertical direction, the lateral direction, and the longitudinal direction, and generate an acceleration signal. With this configuration, the user can perform operation by swinging the first controller 121 and the second controller 122.

[Operation Guide of Game]

Subsequently, a configuration in which the game system 1 of the present embodiment teaches an operation method will be explained. When game processing reaches a predetermined state, the game system 1 displays a video relating to a content of a game on the screen 201, and displays an operation model video in the lower right area of screen 201.

Figure 4:
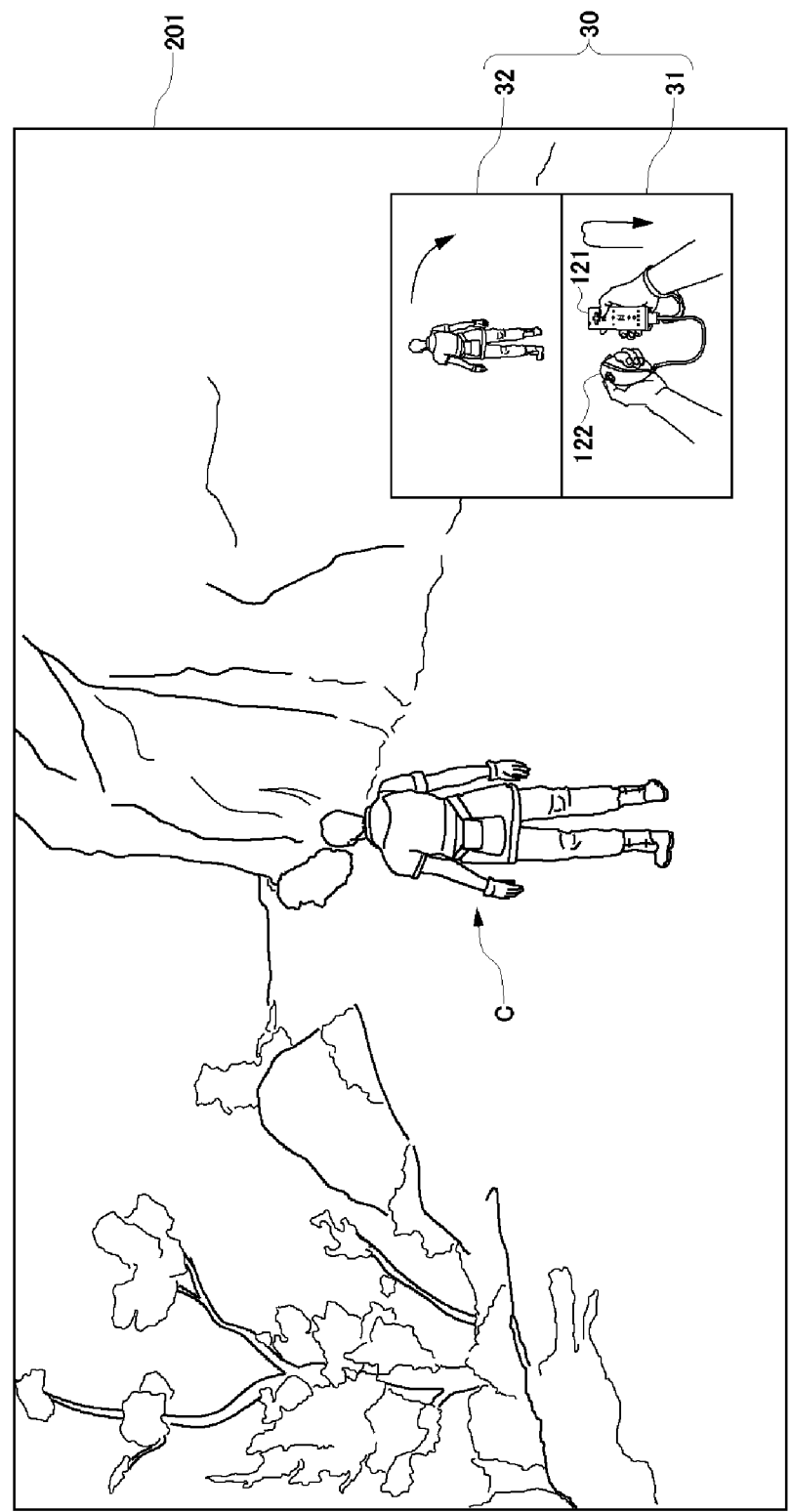
FIG. 4 is a diagram showing a screen example in which an operation guide is displayed on the screen.

FIG. 4 is a diagram showing a screen example displaying an operation model video 31 on the screen 201 of the game system 1 of the present embodiment. The operation model video 31 is a live-action video showing a model of operation of the first controller 121 and the second controller 122. The game system 1 displays, on the operation model video 31, the animation video 32 showing the animation of characters occurring within the game due to an operation shown in the operation model video 31. More specifically, the animation video 32 shows what kind of action the character in the game performs when the player actually performs the operation guided by the operation model video 31. Hereinafter, the operation model video 31 and the animation video 32 will be collectively referred to as "operation guide 30". In FIG. 4, arrows are shown in the operation model video 31 and the animation video 32, but the arrows show motion of the moving picture merely for the sake of convenience of explanation, and the arrows are not actually displayed.

Both the data of the operation model video 31 and the data of the animation video 32 are stored in the optical disk D, and when a predetermined situation occurs, the game system 1 once reads the data from the optical disk D to the main memory 13, and displays its contents. Alternatively, the content of the data read in the main memory 13 is displayed in advance. The present embodiment describes an example in which the data of the operation model video 31 and the data of the animation video 32 are separately held, but one video in which the operation model video 31 and the animation video 32 are arranged one above the other may be generated as data of the operation guide 30 and stored in the optical disk D. In the present embodiment, the data of the operation guide 30 is stored in the optical disk D, but like the game program, it may be stored in a cartridge type memory or a NAND flash memory, not shown, in the game apparatus main body 110, and may also be downloaded to game apparatus main body 110 via a network.

In the example shown in FIG. 4, the operation model video 31 shows a motion picture in which a user swings up and then swings down the first controller 121 held in the right hand in the vertical direction. In the present embodiment, the operation model video 31 shows parts of the operator's hands and arms. As described above, since the operation model video 31 includes parts of the body of the operator, it is easy to understand how to grab and move the first controller 121.

The animation video 32 shows the video in which the character in the game makes a cartwheel to the right. The movement of the right hand in the operation model video 31 and the action of the cartwheel of the character are in synchronization. The game system 1 repeatedly displays this movement until a predetermined end condition is satisfied. With this operation guide 30, the user can easily understand that the user can vertically swing the first controller 121 held in the right hand in order to cause the character to make a cartwheel to the right side. In this example, the operation of the first controller 121 is associated with the animation of character, but the operation target may not necessarily be a character but may be any object in the game.

As shown in FIG. 4, the operation guide 30 is displayed superimposed on the game image, and the game image is also displayed on the screen 201 while the operation guide 30 is being displayed. The operation guide 30 is independent of the progress of the game, and the game system 1 advances the game independently from the display of the operation guide 30. When the user shakes the first controller 121 up and down to imitate the operation shown in operation model video 31, the character C of the player makes a cartwheel in the game image. In this way, while viewing the operation guide 30, the user can actually try operation.

[Predetermined Situation for Displaying Operation Guide]

The operation guide 30 is basically displayed when a new operation becomes possible with the progress of the game. For example, the operation guide 30 is displayed when (i) the character of the player enters into a predetermined area after talking with a non-player character, (ii) the character of the player enters into a predetermined area, and (iii) the character of the player transforms or makes a power up. In addition, (iv) operation guide 30 may be displayed again when the operation guide 30 is displayed and the operation has not been performed for a predetermined period of time since the display of the operation guide 30 is ended. This is because, when an operation shown in the operation guide 30 is not performed even though the operation guide 30 is displayed, it may be possible that the user does not understand the operation.

Examples of conditions for terminating the display of the operation guide 30 include (i) a condition that the character of the player gets out of a predetermined area, (ii) a condition that a predetermined period of time elapses since the output of the operation guide 30 is started, and (iii) a condition that the character of the player has finished a transformation state or a power-up state and returns back to the normal state. For example, (iv) when the operation indicated in the operation guide 30 is successfully performed one or more times, it may be determined that the player is accustomed to the operation and accordingly, the display of the operation guide 30 may be ended.

It should be noted that the above-mentioned predetermined situation for displaying the operation guide 30 is merely an example, and the operation guide 30 may be displayed even in a situation other than the above-mentioned situations, or the display of the operation guide 30 may be ended in a situation other than the above-mentioned situations.

[Operation of Game System]

FIG. 5 is a diagram showing an example of an operation in which the game system 1 of the present embodiment displays an operation model video. In the example shown in FIG. 5, the operation model video is displayed on condition that the character of the player enters into a predetermined area after the character of the player has a conversation with a non-player character.

The game system 1 displays a message of a non-player character (S10), and thereafter, the game system 1 determines whether or not the character of the player has entered into the predetermined area (S11). In a case where the character of the player has not entered into the predetermined area (NO in S11), the determination as to the entry into the predetermined area is repeated (S11) until the character of the player enters into the predetermined area.

When the character enters into the predetermined area (YES in S11), the operation model video corresponding to that area and the animation video of the character are read from the optical disk D (S12). Subsequently, the game system 1 outputs the operation model video 31 and animation video 32 (operation guide 30), which have been read, to the lower right area of the screen 201 (S13).

Even when the operation guide 30 is displayed on the screen 201 in this way, the game system 1 advances the game independently from the operation guide 30. In other words, the player can move the character of the player and cause the character of the player to perform other actions by operating the operation units of first controller 121 and the second controller 122, and moving those controllers and changing the sensor value of acceleration sensor. The game system 1 determines whether or not the character of the player has gotten out of the predetermined area (S14). In a case where the character is determined not to have gotten out of the predetermined area (NO in S14), the operation model video 31 and animation video 32 are continuously output (S13). When the playback of the operation model video 31 or the animation video 32 have been finished, the operation model video 31 or the animation video 32 are continued to be repeatedly played from the beginning. When the character is determined to have gotten out of the predetermined area (YES in S14), the output of the operation model video 31 and the animation video 32 are terminated, and the operation model video 31 and the animation video 32 disappear from screen 201 (S15).

FIG. 6 is a diagram showing another example of an operation in which the game system 1 of the present embodiment displays the operation model video. In the example shown in FIG. 6, an operation model video is displayed on the condition that the form of the character of the player has changed.

The game system 1 determines whether the form of the character of the player has changed (S20). The "change in the form" is, for example, a case in which some item is acquired and a character acquires a new attribute, or a case where a new weapon and the like is acquired to achieve a power up. In a case where the form of the character of the player has not changed (NO in S20), a determination is made as to whether the form of character has changed (S20) until the form of the character of the player changes.

When the form of character has changed (YES in S20), a determination is made as to whether or not the operation model video 31 of the operation which can be performed in the changed form has been output (S21). In a case where the operation model video 31 or the animation video 32 have been output in the past (YES in S21), processing is terminated without outputting the same operation model video 31 and the same animation video 32. As a result, it is possible to avoid a trouble in which the operation model video 31 and the animation video 32 are displayed with regard to the already learned operation.

In a case where any operation model video 31 or any animation video 32 has not yet been output in the past, the operation model video 31 and the animation video 32 are read from the optical disk D to the main memory 13 (S22). Subsequently, the game system 1 outputs the operation model video 31 and the animation video 32 (the operation guide 30), which are read to the main memory 13, to the area at the lower right of the screen 201 (S23).

As described above, even when the operation guide 30 is displayed on the screen 201, the game system 1 advances the game independently from the operation guide 30. The game system 1 determines whether or not a predetermined period of time has elapsed since the display of the operation guide 30 has been started (S24). In a case where the predetermined period of time is determined not to have elapsed (NO in S24), the operation guide 30 is continuously output (S23). In a case where the predetermined period of time is determined to have elapsed (YES in S24), the outputs of the operation model video 31 and the animation video 32 are terminated, and the operation model video 31 and the animation video 32 disappear from the screen 201 (S25).

Subsequently, the game system 1 determines whether or not the operation taught in the operation model video 31 is not performed for a predetermined period of time (S26). In a case where the non-operation state is determined to have continued for the predetermined period of time (YES in S26), the operation model video 31 and the animation video 32 are read again (S22), and the operation model video 31 and the animation video 32 are output to the screen 201 (S23). In a case where the non-operation state is determined not to have continued for the predetermined period of time (NO in S26), the game system 1 terminates the processing.

The game system 1 of the present embodiment displays the operation model video showing the model of the operation of the first controller 121 and the second controller 122 on the screen 201 when a new operation can be performed with a progress in the game, and therefore, the user can concretely understand how to operate the first controller 121 and the second controller 122. It is particularly effective in the case where the input apparatus has the motion sensor just like the one in the present embodiment. Further, the first controller 121 and the second controller 122 may perform different operations in some cases. For example, this includes a case where the user moves the first controller 121 downward and moves the second controller 122 upwards, and a case where the user moves the first controller 121 held with the right hand and the second controller 122 held with the left hand in the opposite directions like the user runs. Models of such continuous and complicated operation can be displayed over time, so that the operator can easily understand. Furthermore, in a case where the number of controllers further increases, the operation tends to be complicated, so that applying the present technique makes it easier for the operator to understand.

The game system 1 of the present embodiment displays the animation video 32 together with the operation model video 31, so that, before the user performs the operation actually displayed with the operation model video 31, the user can find what kind of actions occur when the user performs the operation. Furthermore, when the user compares the animation video 32 and an actual game image obtained when the user performs the operation shown in the operation model video 31, the user can confirm whether or not the operation corresponding to the animation video 32 is occurring in the game image. This allows the user to check whether the operation performed by the user is correct or not. The arrangement of the operation guide 30 in which the animation video 32 is arranged in the upper row and the operation model video 31 is arranged in the lower row is in a manner close to a positional relationship when the user operates the controller 120 while watching the screen 201, and therefore, it is easy for the user to intuitively understand the contents of the operation guide 30.

In the game system 1 of the present embodiment, the live-action video obtained by shooting the scene when the user actually performs the operation is used as the operation model video 31, and therefore, it is easy to distinguish the operation model video 31 from the game image, the user can readily notice that the guidance for the operation is displayed.

[Modification]

Although the game system 1 of the present embodiment and the game program for realizing the game system 1 have been described above, the game system and the game program of the present technique are not limited to the above-mentioned embodiments.

In the above embodiment, the operation model video 31 and the animation video 32 are read from the optical disk D and displayed on the screen 201, but the animation video 32 may be rendered in real time. Alternatively, a single motion picture file obtained by combining the operation model video 31 and the animation video 32 in a vertical direction may be stored in the optical disk D. When the operation model video 31 and the animation video 32 have large sizes, the operation guide 30 may be read in advance a predetermined period of time before the operation guide 30 is displayed, e.g., at the time of the start of the game or the start of a stage, rather than reading the operation guide 30 immediately before the operation guide 30 is displayed, so that a time lag of reading and the like can be prevented. Further, although the operation model video 31 and the animation video 32 are once read out to the main memory 13 and displayed, the data read from the optical disk D may be displayed without going through the main memory 13.

In the above embodiment, live-action video showing the model of the operation is used as the operation model video, but the operation model video may not necessarily be a live-action picture and may be animation or CG. In this case, the video is required to be sufficiently smooth so that the state of operation can be clearly seen, and the sample rate of motion picture is preferably 20 frames/second or more, and more preferably, the sample rate of motion picture is 30 frames/second or 60 frames/second. When a live-action video is used, it can be easily distinguished from the video related to the contents of the game, and the user can easily recognize that it is a video for the guide of operation method. Compared to animation, CG, and the like, the live-action video requires less steps to prepare.

In the above-described embodiment, an example for displaying the operation model video 31 and the animation video 32 arranged side by side has been explained, but the animation video 32 is not necessary, and only the operation model video 31 may be displayed.

In the above-described embodiment, an example of displaying the operation guide 30 at the lower right of the monitor 200 has been explained, but the position at which the operation guide 30 is displayed is not limited to the lower right. For example, it is also possible to, on every occasion, determine where is a position at which there is no important object depending on the progress of the game, and display the operation guide 30 at a position where there is no important object. The size of the operation guide 30 may be changed in relation to other objects in the virtual space. Further, the operation guide 30 may not overlap the game image, and the area displaying the game image and the area displaying the operation guide 30 may be clearly separated.

In the embodiment described above, for example, the controller 120 having the motion sensor has been explained as the input apparatus, but the present technique is also effective in an input apparatus having a touch panel and a game system using an input apparatus and the like for detecting the posture of the user by a depth sensor.

In the above-described embodiment, the stationary game machine has been described as an example, but the present technique can also be applied to any information processing apparatus such as a portable game machine, a PC, and the like.

What is claimed is:

1. A non-transitory storage medium having a game program stored therein, the program, when executed, being configured to cause a computer of an information processing apparatus that is connected to a display apparatus and an input apparatus and that performs game processing based on an operation performed by a user, to at least:
output to the display apparatus, when the game processing is in a predetermined situation, an operation model video providing a model of how to operate the input apparatus, together with a video related to content of a game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game,
wherein an animation video indicating an animation occurring in the game when the operation indicated by the operation model video is performed is output together with the operation model video.

2. The non-transitory storage medium according to claim 1, wherein the operation model video is a video obtained by shooting an actual operation performed with the input apparatus.

3. The non-transitory storage medium according to claim 1, wherein the operation model video has a frame rate that is high enough to be played smoothly.

4. The non-transitory storage medium according to claim 1, wherein the operation model video contains at least a part of a body of an operator of the input apparatus.

5. The non-transitory storage medium according to claim 1, wherein the operation model video and the animation video are output side by side.

6. The non-transitory storage medium according to claim 1, wherein the input apparatus has a motion sensor and/or a touch panel.

7. The non-transitory storage medium according to claim 1, wherein the input apparatus has two controllers.

8. The non-transitory storage medium according to claim 1, wherein the output of the operation model video begins when a new operation is ready to be performed in accordance with progress of the game.

9. A non-transitory storage medium having a game program stored therein, the program, when executed, being configured to cause a computer of an information processing apparatus that is connected to a display apparatus and an input apparatus and that performs game processing based on an operation performed by a user, to at least:

output to the display apparatus, when the game processing is in a predetermined situation, an operation model video providing a model of how to operate the input apparatus, together with a video related to content of a game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game; and control an object in the game according to an operation performed by user with the input apparatus and output a result thereof to the display apparatus, wherein the output of the operation model video is started when the object enters into a predetermined range in a virtual space.

10. The non-transitory storage medium according to claim 1, wherein the program, when executed, is further configured to cause the computer of the information processing apparatus to at least count a time from when the operation model video begins being output, wherein the output of the operation model video is terminated when a time counting result reaches a predetermined time.

11. An information processing apparatus connected to a display apparatus and an input apparatus and being configured to perform game processing based on an operation performed by a user, the information processing apparatus comprising:

at least one processor and a memory coupled thereto, the at least one processor being configured to output, to the display apparatus, when the game processing is in a predetermined situation, an operation model video providing a model of how to operate the input apparatus, together with a video related to content of the game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game, wherein an animation video indicating an animation occurring in the game when the operation indicated by the operation model video is performed is output together with the operation model video.

12. An information processing system comprising:
a display apparatus;
an input apparatus; and
an information processing apparatus configured to perform game processing based on an operation performed by a user, wherein:
the information processing apparatus is configured to output, to the display apparatus, when the game processing is in a predetermined situation, an operation model video providing a model of how to operate the input apparatus, together with a video related to content of the game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game; and an animation video indicating an animation occurring in the game when the operation indicated by the operation model video is performed is output together with the operation model video.

13. A game processing method for performing game processing based on an operation performed by a user with an information processing apparatus that is connected to a display apparatus and an input apparatus, the game processing method comprising:

outputting to the display apparatus, when the game processing is in a predetermined situation, an operation model video providing a model of how to operate the input apparatus together, with a video related to content of the game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game; and outputting an animation video indicating an animation occurring in the game when the operation indicated by the operation model video is performed is together with the operation model video.

14. An information processing apparatus connected to a display apparatus and an input apparatus and being configured to perform game processing based on an operation performed by a user, the information processing apparatus comprising:

at least one processor and a memory coupled thereto, the at least one processor being configured to output, to the display apparatus, when the game processing is in a predetermined situation, an operation model video providing a model of how to operate the input apparatus, together with a video related to content of the game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game, wherein the output of the operation model video begins when a new operation is ready to be performed in accordance with progress of the game and the output of the operation model video continues for a predetermined amount of time.

15. An information processing apparatus connected to a display apparatus and an input apparatus and being configured to perform game processing based on an operation performed by a user, the information processing apparatus comprising:

at least one processor and a memory coupled thereto, the at least one processor being configured to:
output, to the display apparatus, when the game processing is in a predetermined situation, an operation model video providing a model of how to operate the input apparatus, together with a video related to content of the game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game; and control an object in the game according to an operation performed by user with the input apparatus and output a result thereof to the display apparatus, wherein the output of the operation model video is started when the object enters into a predetermined range in a virtual space.

16. A game processing method for performing game processing based on an operation performed by a user with an information processing apparatus that is connected to a display apparatus and an input apparatus, the game processing method comprising:

outputting to the display apparatus, when the game processing is in a predetermined situation, an operation model video providing a model of how to operate the input apparatus together, with a video related to content of the game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game, wherein the output of the operation model video begins when a new operation is ready to be performed in accordance with progress of the game and the output of the operation model video continues for a predetermined amount of time.

17. A game processing method for performing game processing based on an operation performed by a user with an information processing apparatus that is connected to a display apparatus and an input apparatus, the game processing method comprising:

outputting to the display apparatus, when the game processing is in a predetermined situation, an operation model video providing a model of how to operate the input apparatus together, with a video related to content of the game achievable via operation of the input apparatus in accordance with the model, the operation model video being provided in a first display area of a game screen displayable via the display apparatus, the video related to content of the game being provided in a second display area of the game screen, the first and second display areas being different from one another and being displayable together with a main game screen that advances with play of the game; and controlling an object in the game according to an operation performed by user with the input apparatus and output a result thereof to the display apparatus, wherein the output of the operation model video is started when the object enters into a predetermined range in a virtual space.

* * * * *